US005392664A

United States Patent [19]
Gogins

[11] Patent Number: 5,392,664
[45] Date of Patent: Feb. 28, 1995

[54] CONTINUOUSLY VARIABLE TRANSMISSION

[76] Inventor: Laird B. Gogins, 123 Second Ave. #1207, Salt Lake City, Utah 84103

[21] Appl. No.: 930,928

[22] Filed: Aug. 14, 1992

[51] Int. Cl.⁶ ............................................. F16H 29/04
[52] U.S. Cl. ........................................ 74/117; 74/119
[58] Field of Search ................ 74/116, 117, 118, 119, 74/835, 836

[56] References Cited

U.S. PATENT DOCUMENTS

| | | | |
|---|---|---|---|
| 982,666 | 1/1911 | Girin | 74/119 |
| 2,204,514 | 6/1940 | Schlote | 74/117 |
| 2,521,711 | 9/1950 | Galliano | 74/117 |
| 2,618,981 | 11/1952 | Przybylski | 74/119 |
| 2,692,510 | 10/1954 | Gille | 74/116 |
| 2,834,223 | 5/1958 | Strnad | 74/117 |
| 2,864,256 | 12/1958 | Troeger | 74/117 |
| 3,915,129 | 10/1975 | Rust et al. | 74/569 X |
| 4,112,778 | 9/1978 | Korosue | 74/117 |
| 4,442,726 | 4/1984 | Poccia | 74/117 |

FOREIGN PATENT DOCUMENTS

| | | | |
|---|---|---|---|
| 28510 | 12/1923 | France | 74/117 |
| 1162279 | 11/1956 | France | 74/117 |
| 822642 | 7/1949 | Germany | 74/117 |
| 167526 | 8/1921 | United Kingdom . | |
| 210961 | 2/1924 | United Kingdom | 74/117 |
| 446113 | 4/1936 | United Kingdom | 74/117 |
| 484692 | 8/1936 | United Kingdom | 74/117 |

Primary Examiner—Dirk Wright
Assistant Examiner—Khoi Q. Ta
Attorney, Agent, or Firm—Thorpe, North & Western

[57] ABSTRACT

A transmission for providing continuously variable speed and torque comprises a housing, an input shaft, a system of variable throw eccentrics, control means for changing eccentric throw of the variable throw eccentrics, connecting links for receiving eccentric throw from the system of variable throw eccentrics and transmitting it as reciprocal motion and removing ripple from the output, one-way clutches for receiving reciprocal motion from connecting links and transmitting it as rotational motion, and an output shaft. The control means comprise a control shaft rotatably disposed around the input shaft so that both shafts have the same rotational axis and with a fork fixed to the control shaft, a pin fixed at one end to an eccentric and engaged between the prongs of the fork, and means for rotating the control shaft with respect to the input shaft, thus changing the eccentric throw and the transmission ratio. Reversible and nonreversible hydraulic one-way clutches, means for reversing rotation of the output shaft, and means for compression braking are also within the scope of the invention.

20 Claims, 11 Drawing Sheets

CONTINUOUSLY VARIABLE TRANSMISSION

BACKGROUND OF THE INVENTION

This invention relates to a transmission for and a method of changing speed and torque from an input power source. More particularly, the invention relates to a transmission for and a method of selecting from an "infinite" number of output torques and speeds, from maximum to as low as zero output speed, for vehicles, industrial speed changers, and the like, wherein ripple, or variation in rotational speed induced by crank action, is removed from the output.

Numerous devices and methods have been devised to change the speed and torque from a prime mover. One category of such devices and methods involves variable and fixed speed transmissions known as ratchet drives. Transmissions of this type include those that contain variable throw cranks, variably displaced fulcrums, and variable length lever arms.

An example of a variable throw system is described in U.S. Pat. No. 3,915,129 by Rust. In this device, a timing cam, with a distance from axis of rotation to cam surface that varies along its axis of rotation, is used to vary valve operating characteristics as a function of the position of a cam follower along the axis of rotation of the cam. Examples of other such devices have been described in U.S. Pat. No. 3,915,129; U.S. Pat. No. 3,229,546; U.S. Pat. No. 2,159,739; Italian Pat. No. 460047; and French Pat. No. 590,087.

Transmissions usually have fixed gear ratios that, although suitable for many uses, may be inadequate when the speed or torque needed is not efficiently provided by available gear ratios. For example, if the lowest gear ratio provided by a transmission having certain fixed gear ratios does not provide sufficiently low speed or sufficiently high torque for a given application, then the transmission is not suitable for the job. Thus it would be advantageous to provide a transmission that can furnish an infinite number of gear ratios and, consequently, an infinite number of output speeds and torques, between zero and some maximum.

Another problem associated with many transmissions is that shifting between gear ratios involves loss of power. Shifting gears while driving a motorized vehicle uphill illustrates this problem, inasmuch as the loss of power associated with shifting gears rapidly results in a loss of momentum. Thus, it would be advantageous to provide a transmission that could be shifted between an infinite number of available gear ratios without interrupting output power.

Additionally, many industrial machines are powered by constant speed electrical motors. Thus, it would be desirable to provide an industrial speed changer that can provide a wide variety of output speeds and torques. Because of the large variety of uses for such speed changers, it would be desirable to have a family of industrial speed changers that could fit the many needs for them, yet that could be manufactured from a few identical parts.

Certain applications require wide ranges in transmission gear ratios, such as in certain types of bicycles. Since a human does not generate much power except at certain pedaling speeds, it would be advantageous to provide a transmission that, efficiently furnishes a wide range of selectable gear ratios to allow for increased speed and distance for the same or less effort.

It would also be advantageous to provide a transmission that is inexpensive to build, yet reliable. Such a transmission would be suitable for many different kinds of vehicles, from bicycles to motorized vehicles such as cars, trucks, buses, trains, tractors, and the like.

Also, a transmission that is light in weight and has a wide range of transmission ratios would not only provide improved fuel economy, but also improved acceleration and hill climbing ability.

OBJECTS AND SUMMARY OF THE INVENTION

It is an object of the present invention to provide a transmission or torque-multiplying, constant power speed changer that is inexpensive, reliable, and can supply an infinite number of speed ratios and be easily shifted.

It is also an object of the invention to provide a low cost, light weight vehicular transmission that, because of its wide ratio range, improves fuel economy, acceleration, and control ability of land, air, and water vehicles.

It is another object of the invention to provide a low cost industrial speed changer that can be driven by a constant-speed motor and efficiently provide a wide variety of output speeds and torques.

It is a further object of the invention to provide a transmission with a wide ratio range and high efficiency that would be suitable for use in a bicycle.

These and other objects may be realized in an illustrative embodiment of a transmission comprising a housing, a rotatable input shaft for receiving a rotational input having a certain speed, one or more variable throw eccentrics longitudinally disposed on the input shaft, a mechanism for selectively changing eccentric throw of the eccentrics between a minimum throw (which may be zero) and a maximum throw, a rotatable output shaft for providing a rotational output having selected speeds and torques, one or more one-way clutches mounted on the output shaft, and connecting links coupled between the eccentrics and the clutches for transmitting motion from the eccentrics to the clutches to, in turn, cause rotation of the output shaft and for removing ripple from the output. Ripple is removed from the output shaft speed by guiding the connecting links in selected paths to effectively change the lengths and motion of certain links so that rotation of the clutches is slowed or accelerated during certain phases of rotation to provide constant output speeds of the output shaft, at desired transmission ratios.

Novel hydraulic one-way clutches may be utilized to drive the output shaft as the clutches rotate in one direction, and rewind as the clutches rotate in the opposite direction. Output rotation may be reversed by use of a reversible hydraulic clutch, by a spur gear differential, or by other methods.

The transmission of the present invention may be used to provide compression braking for an engine driven vehicle by mounting the transmission in the opposite orientation to the drive train of the vehicle.

DETAILED DESCRIPTION OF THE INVENTION

Figure 1:
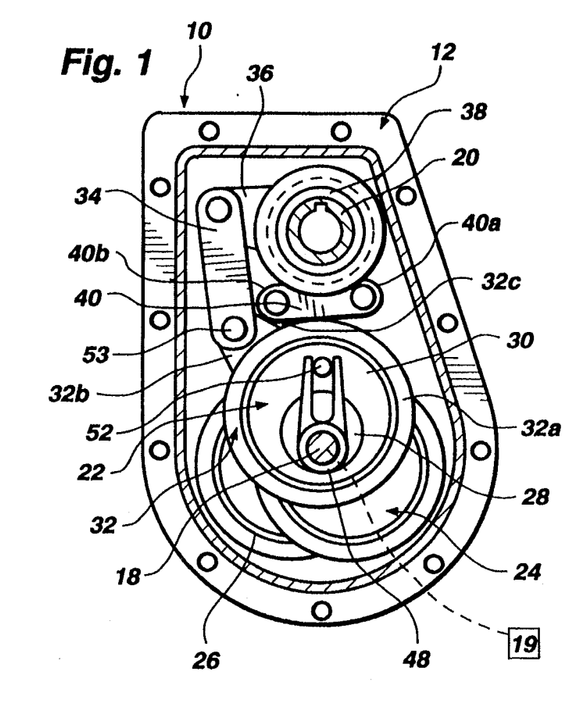
FIG. 1 is a partially cross-sectional, elevational end view of an infinitely variable transmission, made in accordance with the present invention.
Figure 2:
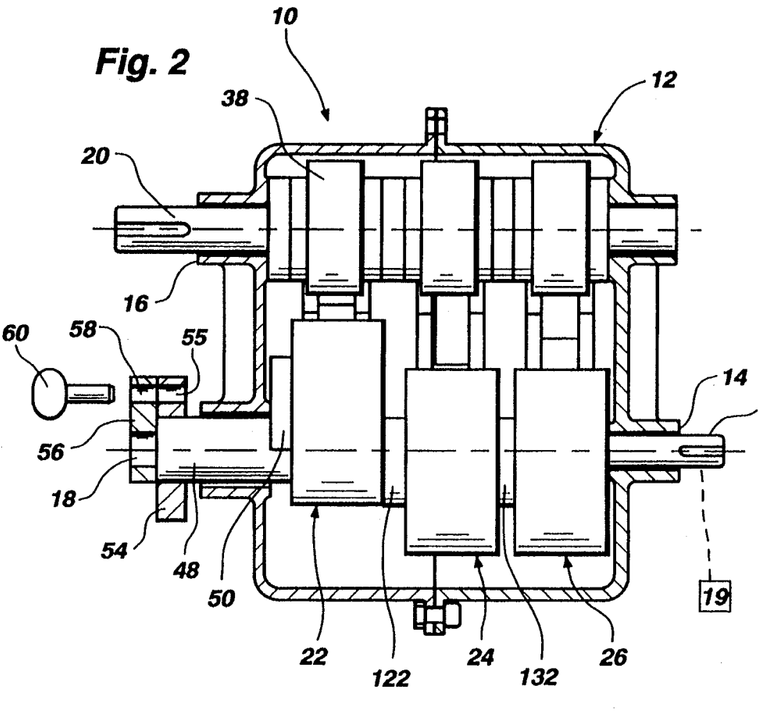
FIG. 2 is a partially cross-sectional, elevational side view of the transmission shown in FIG. 1.

Reference is now made to the drawings wherein like components are designated by like numerals throughout. FIGS. 1 and 2 represent one embodiment of the transmission of the present invention. The transmission 10 is contained in a housing 12 that includes an input shaft opening 14 (FIG. 2) and an output shaft opening 16 (FIG. 2). Disposed in the input shaft opening 14 is a rotatable input shaft 18, turned by a power source or prime mover 19. Through the output shaft opening 16, a rotatable output shaft 20 transmits power to a final drive or output.

Within the housing 12 are a plurality of identical inner eccentrics 28 mounted longitudinally on the input shaft 18. The embodiment of the present invention shown in FIGS. 1 and 2 shows three variable throw eccentric assemblies 22, 24, and 26, each angularly displaced 120 degrees out of phase with respect to the other eccentrics (best seen in FIG. 1). In a transmission with four variable throw eccentrics, the variable throw eccentrics would be 90 degrees out of phase, etc. Each variable throw eccentric contains two eccentrics, a smaller inner eccentric, such as shown at 28 (FIG. 1), that is fixedly attached to the input shaft 18, and a larger outer eccentric, such as shown at 30, that is journaled onto, and thus turnable on, its corresponding inner eccentric 28.

The eccentricity of the inner eccentric 28 (distance from its center to center axis of shaft 18) and outer eccentric 30 (distance from its center to center of inner eccentric 28) may be the same or different. In one embodiment of the invention, the eccentricities of the inner eccentric 28 and outer eccentric 30 are the same so that when the inner eccentric 28 and outer eccentric 30 are held in phase with each other and rotate as one unit, they produce a maximum throw, i.e. maximum eccentricity for the assembly of eccentrics 28 and 30, and when they are held 180 degrees out of phase with respect to each other and are rotated as one unit, they produce zero throw, i.e., no eccentricity for the assembly. When the inner and outer eccentrics are neither in phase nor 180 degrees out of phase, any amount of throw of the assembly between zero and maximum may be produced. This ability to provide effectively an infinite number of eccentric throws, between zero and maximum, together with means for selectively choosing the throws, means for removing ripple from and delivering motion to output shaft 20, and one-way clutches for providing rotational motion to the output shaft 20, is the essence of the ability to provide an infinite number of output speeds and torques.

Journaled onto the outer eccentrics, such as outer eccentric 30, are connecting linkages for transmitting eccentric throw motion produced by the eccentrics to, ultimately, the output shaft 20. FIG. 1 depicts an embodiment of this connecting linkage as it would be connected to one variable throw eccentric. Each variable throw eccentric in the transmission 10 would have similar connecting linkage attached to it. In FIG. 1, the connecting linkage for outer eccentric 30 comprises a first link 32 having an annulus 32a and radially projecting tab 32b, a second link 34, and a bell crank 36. The annulus 32a of the first link 32 is journaled about the outer eccentric 30 and pivotally connected via tab 32b to the second link 34 that is itself pivotally connected to bell crank 36. Bell crank 36 is also connected to a conventional one-way or overrunning clutch or ratchet 38 such as that manufactured by Torrington. One-way clutch 38 is coupled to the output shaft 20.

An anti-ripple link 40 is pivotally mounted at one end 40a to the housing 12, and at the other end 40b to a tab 32c fixed to annulus 32a. This link serves to reduce or remove ripple from the output shaft 20 motion, as will be described hereafter.

Rotation of input shaft 18 causes eccentrics 28 and 30 (at a selected throw) to rotate as one inside annulus 32a. With such rotation, annulus 32a is caused both to rotate partially and to move in the direction toward and away from link 34. Other than only a partial rotation, annulus 32a is otherwise constrained from rotational movement by link 40, in which link end 40b is caused to swing in an arc. The reciprocating movement of the annulus 32a in the direction of the link 34 causes the link 34 to reciprocate and this, in turn, causes the bell crank 36 to rotationally oscillate the overrunning clutch 38. The clutch 38, when bell crank 36 rotates clockwise, for example, drives output shaft 20 to rotate clockwise; and when the bell crank 36 rotates counterclockwise relative to the output shaft the clutch 38 overruns or rewinds in preparation for the next drive stroke.

A preferred means of removing ripple from the rotation of the output shaft 20, is through anti-ripple link 40. Anti-ripple link 40 swings in an arc as the input shaft 18 rotates eccentric assembly 22, causing the effect in the length and motion of link 34 to vary in such a way as to remove or reduce ripple from the rotation of the output shaft 20, which ripple is originally induced by rotation of the eccentric assembly 22. That is, in order to remove or reduce ripple from the output rotation speed/torque, it is necessary to modify the essentially sinusoidal variation of such speeds/torques induced by the rotating eccentric. Output rotation speed of shaft 20 must be increased at the beginning of the drive phase, slowed during the middle of the drive phase, and again sped up at the end of the drive phase (just before beginning the rewind phase) to produce a substantially constant rotational speed of the output shaft 20. The controlled variation of rotation speed of the bell crank 36, and thus of the output shaft 20, is achieved by effectively varying the length and motion of link 34—this is done by proper selection of the arc, and thus the length and pivot location, of link 40. The anti-ripple link shown in FIG. 1 would remove ripple at one selected transmission ratio and reduce ripple at other ratios.

Figure 4A:
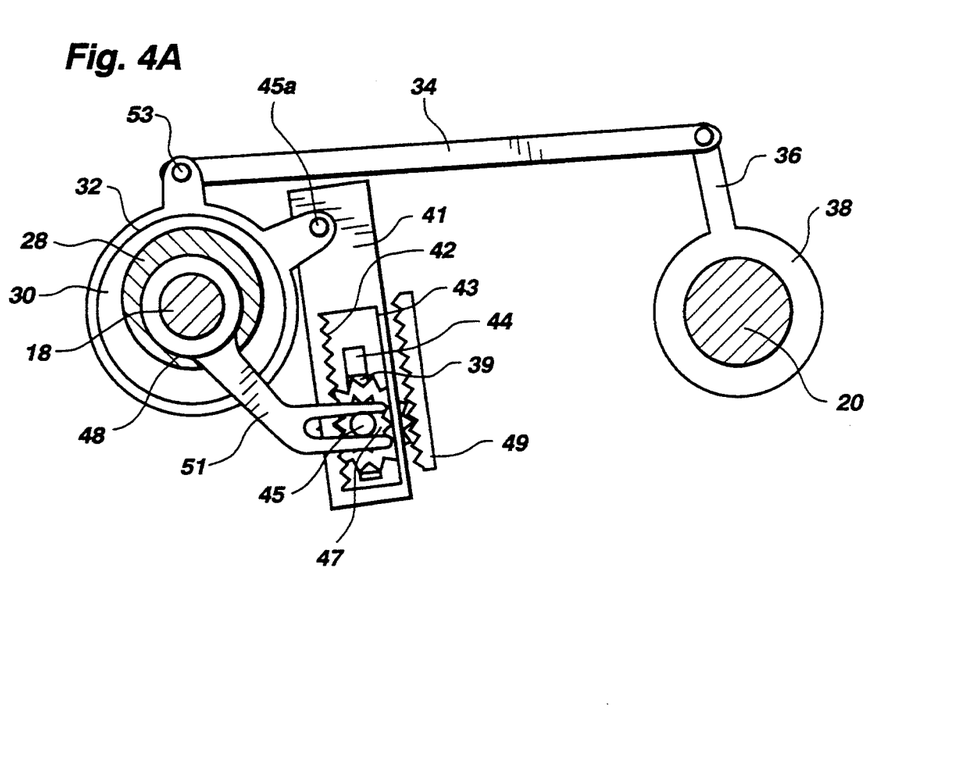
FIGS. 4A and 4B are elevational views of two embodiments of anti-ripple connecting linkages, suitable for use in the present invention.

An alternative embodiment of an anti-ripple link is shown in FIG. 4A. In this embodiment, anti-ripple link 41 includes a rack gear 42 formed at an edge of an elongate opening 43 in link 41. A fulcrum pin 45 with a cluster gear 47 journaled thereupon extends from a slide 39, slidably constrained in a groove 44 cut into housing 12. Cluster gear 47 is in meshing relationship with both rack gear 42 and with a rack gear 49 attached to housing 12. Fulcrum pin 45 is engaged in yoke 51 that is fixed to and extends from a control shaft 48 which is journaled on input shaft 18. When control shaft 48 is turned clockwise, cluster gear 47 moves down causing rack gear 49 to turn gear 47 (in mesh with rack gear 42) counterclockwise and pull link 41 downwardly, thereby shortening the distance between pins 45 and 45a. Thus, the length of anti-ripple link 41 is effectively shortened and the location of fulcrum pin 45 is changed, which changes displace pin 53 to change the effective length and the oscillatory path of link 34. This effectively provides a ripple-free output in all transmission ratios, as earlier described (see FIGS. 1 and 4A).

Figure 4B:
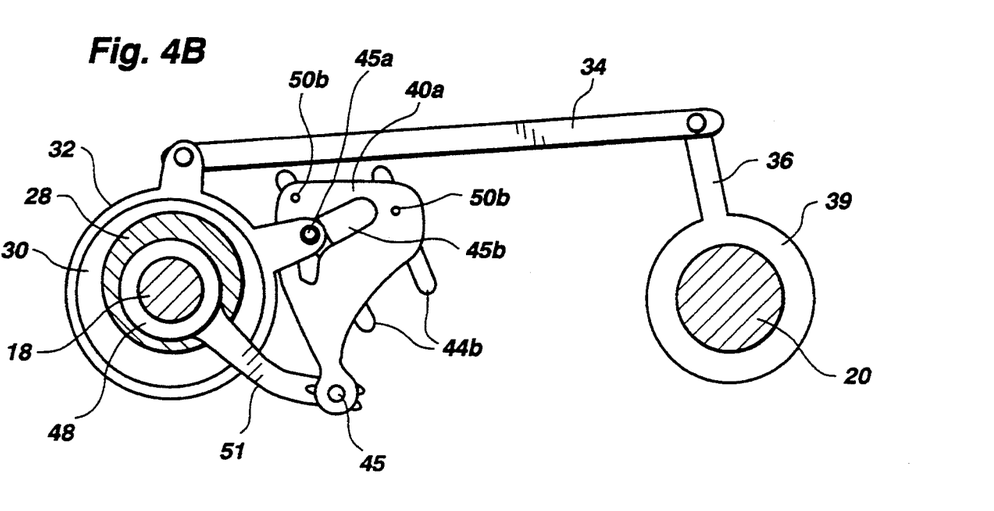

An alternative method of guiding the oscillatory path of the connecting linkage is to extend pin 45a perpendicularly to the plane of link 32, FIG. 4B, so that it is received in a contoured slot 45B in link 40A. Pin 45 extending from link 40A engages in fork 51 fixed to control shaft 48. Link 40A is guided by pins 50B riding in slots 44B to provide essentially ripple-free outputs, in all ratios. The assembly may be simplified by cutting one slot 45B in housing 12 and doing away with link 40A, control link 51, pins 50B and slots 44B to remove ripple from one ratio and reduce it in others.

Figure 5:
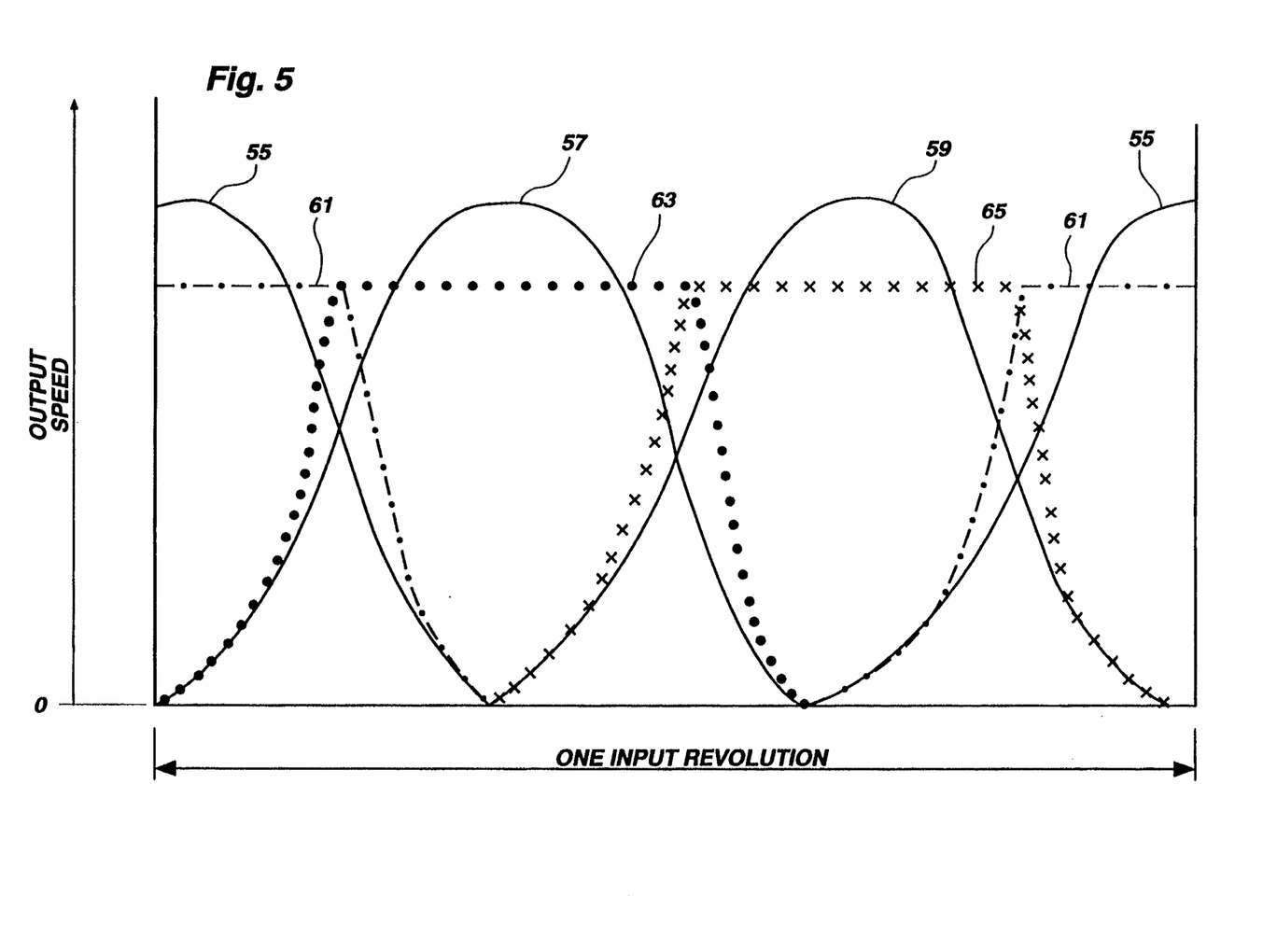
FIG 5 is a graphic representation of the effect of anti-ripple connecting linkages on output speed of a power source utilizing the present invention.

The effect of ripple-removal linkage on the output speed is shown in FIG. 5. In a transmission with three variable throw eccentrics, driving the output without the above-described ripple-removal linkages, is shown by curves 55, 57, and 59, (whichever bell crank 36 is driven the fastest will drive the output shaft 20). The ripple-removal linkage of the present invention provides ripple-free output as shown by curves 61, 63, and 65 of FIG. 5.

Figure 10:
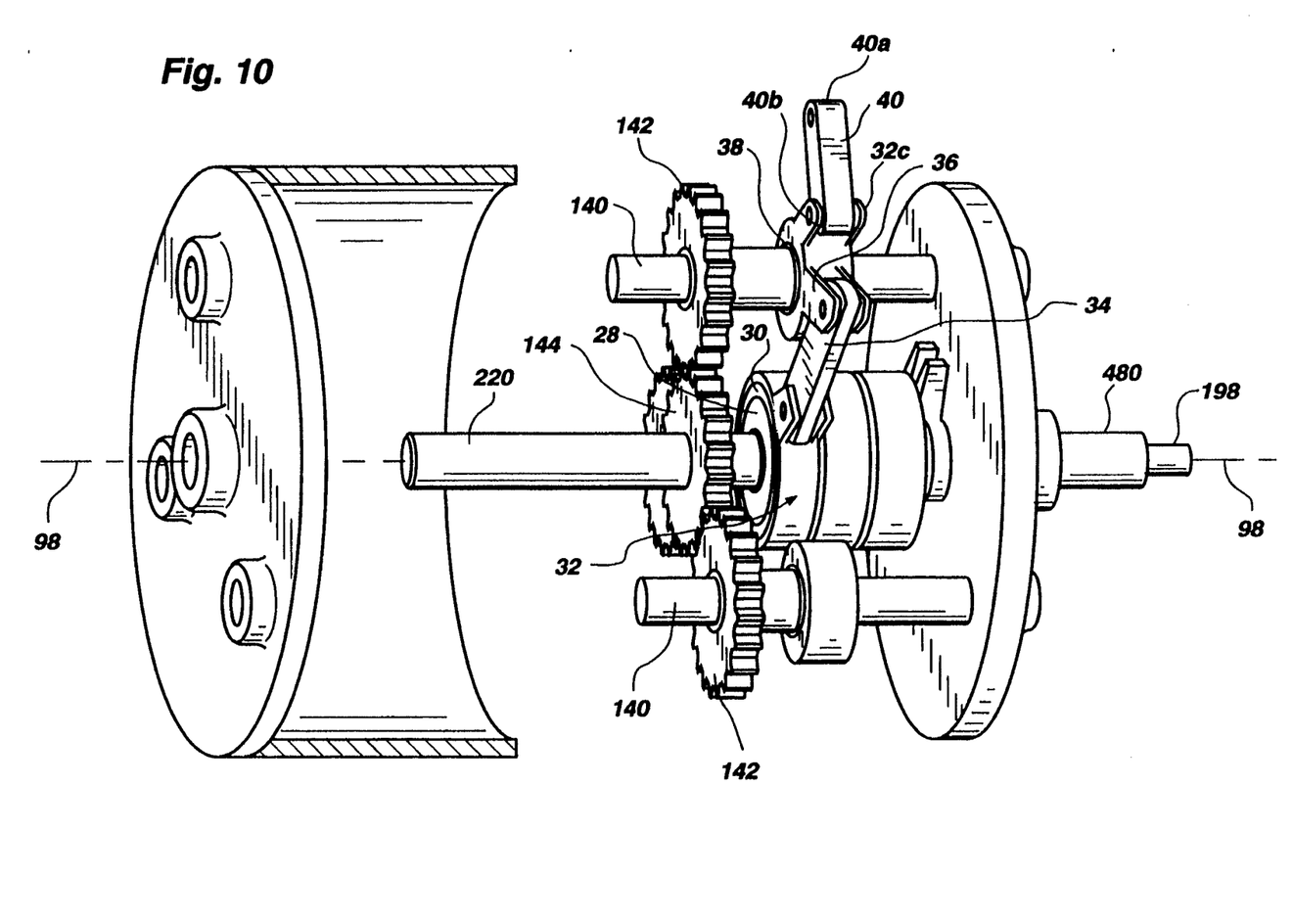
FIG. 10 is a partially exploded, perspective view of radially disposed connecting linkages, made in accordance with the present invention.
Figure 11:
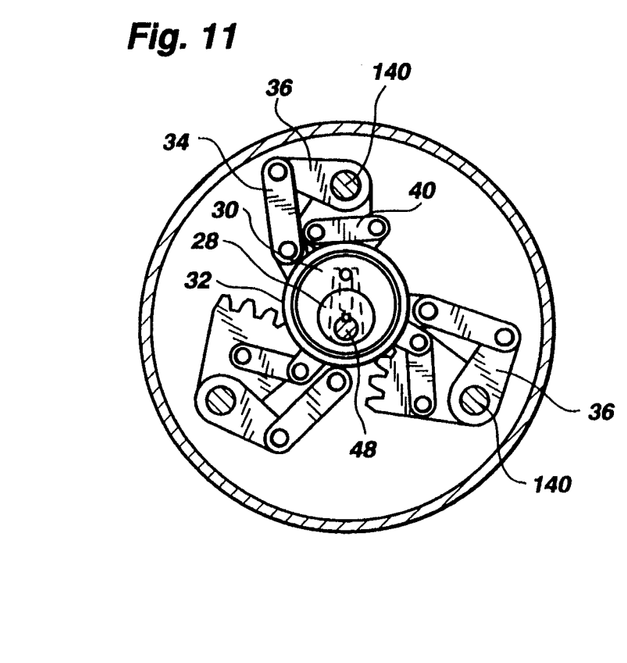
FIG. 11 is a partially cross-sectional, elevational end view of another embodiment of a transmission made in accordance with the present invention.
Figure 12:
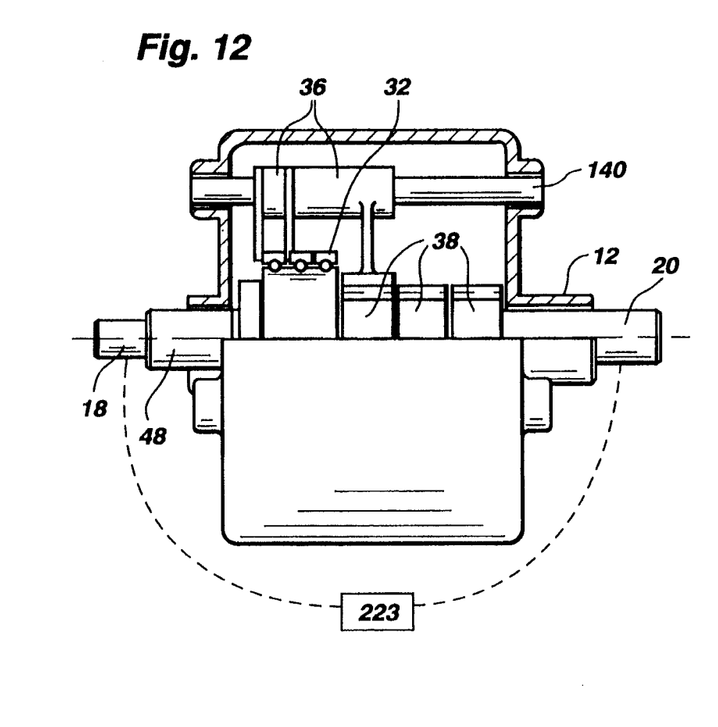
FIG. 12 is a partially cross-sectional, elevational side view of the transmission of FIG. 11.

Identical sets of connecting linkage may be variously oriented with respect to the variable throw eccentrics and still be within the scope of the present invention. For example, the connecting linkages may be arranged linearly along the length of the input shaft as in FIGS. 1–3. Other embodiments may place identical sets of connecting linkages radially about a centrally located eccentric, as illustrated in FIGS. 10, 11, and 12 (to be discussed momentarily).

Various types of conventional one-way clutches may be used advantageously within the scope of the present invention. For example, mechanical one-way clutches 39 (FIG. 4B) such as roller clutches and sprag clutches work well in low horsepower applications. In a preferred embodiment, a hydraulic one-way clutch may be used, as will next be discussed.

Figure 6:
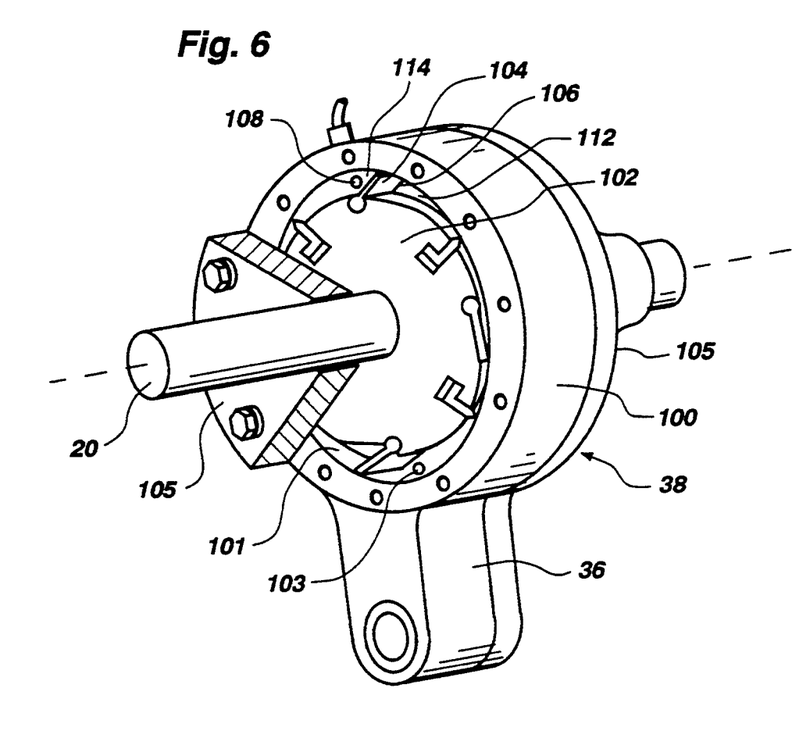
FIG. 6 is a perspective, partially cutaway view of a hydraulic one-way clutch, made in accordance with the present invention.

One type of hydraulic one-way clutch is depicted in FIG. 6. The one-way clutch 38 includes an output shaft 20. Oscillatory motion is provided through a bell crank 36. The clutch 38 includes a housing 100 formed with an interior surface 101, that defines an oblate interior chamber 103, and end bells 105 (one of which is shown as fragmented) journaled on output shaft 20 and bolted to housing 100. Fixedly attached to output shaft 20 by key or spline is a rotor 102. Attached at intervals around the periphery of rotor 102 are hinged vanes 104. Each hinged vane 104 is biased outwardly toward the interior surface 101 of the housing 100 by biasing spring 106. Filtered low pressure oil is constantly fed by ball check valve 108 (disposed in the housing 100) into the interior chamber 103 of the clutch 38.

In operation, when bell crank 36 and housing 100 are rotated in a counterclockwise direction, oil in space 112 is trapped between the interior surface 101 of housing 100, rotor 102, and hinged vane 104. The non-compressible oil trapped in space 112 acts as a wedge, "wedging" rotor 102 to clutch housing 100 and, thus, movement of bell crank 36 drives rotor 102 and shaft 20 in a counterclockwise direction. When bell crank 36 is turned in the clockwise direction, oil in space 114 is trapped between vane 104 and interior surface 101. Pressure building up by this trapping pushes against vane 104, causing spring 106 to compress and permitting oil to flow between the tip of vane 104 and interior surface 101 of clutch housing 100, thus allowing overrunning of the clutch 38 on output shaft 20. The clutch 38 would then rewind and be ready for the next counterclockwise or driving stroke.

Figure 7:
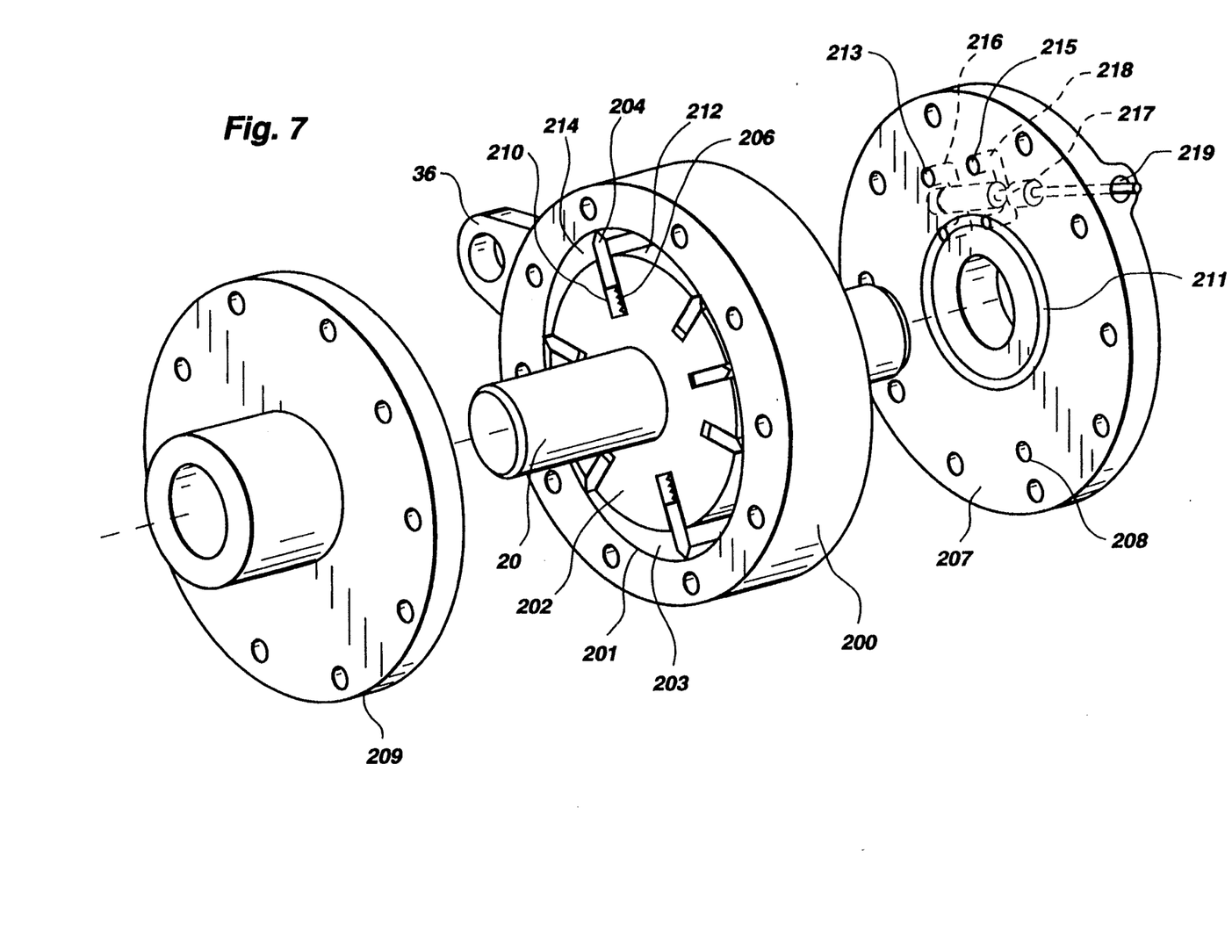
FIG. 7 is a perspective, exploded view of a reversible hydraulic one-way clutch, made in accordance with the present invention.

Alternatively, a reversible one-way clutch may be used, as shown in FIG. 7. A housing 200, including an interior surface 201, and first 207 and second 209 end plates bolted to the housing 200, define an oblate interior chamber 203. The first 207 and second 209 end plates are journaled and rotatable on output shaft 20. Inside the oblate interior chamber 203 and fixedly attached to output shaft 20 is rotor 202 including radially disposed slots 210 at intervals around the periphery of the rotor. Slidably engaged in each slot 210 is a vane 204 that is biased against the interior surface 201 of the housing 200 by biasing spring 206. The outside tip of each vane is shaped or tapered to point as shown.

First end plate 207 contains a circular groove 211 that is concentric with the axis of rotation of end plate 207 about output shaft 20. Groove 211 is also positioned so that it provides a passageway into slots 210 in rotor 202. First end plate 207 also contains two ports 213 and 215 that connect passageways 216 and 218 through spool valve 217 with groove 211. Spool valve 217 is disposed in opening 219 in first end plate 207 adjacent to passageways 216 and 218 to permit selective opening or closing of passageways 216 and 218, or closing of them both. A ball check valve 208 allows for a continual supply of oil therethrough to the interior chamber 203.

In operation, when spool valve 217 is adjusted to close passageway 216 and open passageway 218, oil contained in space 212 may freely move through passageway 218. When bell crank 36 moves in a counterclockwise direction, oil in space 212 tends toward compression causing an increase in pressure and a consequent transfer of pressure through port 215, passageway 218, and groove 211 to cause an increase in the pressure of oil in slots 210 under vanes 204. The pressure of the oil under vanes 204 exceeds the pressure exerted on the top of vane 204, because of the difference in areas between the top and bottom of vane 204, and against the biasing spring means 206, thus trapping oil in space 212. The oil trapped in space 212 acts like a wedge causing rotor 202 to move counterclockwise with housing 200. When bell crank 36 moves in a clockwise direction, oil pressure in space 212 tends to drop and oil pressure in space 214 tends to rise but is prevented from flowing through passageway 216 by the closed spool valve 217 and cannot push up against vane 204. Thus, the oil pressure on top of vane 204 pushes vane 204 down into slot 210 and laminar flow of oil from space 214 to space 212 occurs. This permits overrunning of the clutch 38 on output shaft 20 and rewinding for another counterclockwise or driving stroke by bell crank 36.

The clutch 38 can be reversed by opening passageway 216 and closing passageway 218 by moving the spool valve 217. The principles described above then work to cause output shaft 20 to be driven when bell crank 36 moves in a clockwise direction and causes rewinding of the clutch 38 when bell crank 36 moves in a counterclockwise direction, thus reversing output rotation of this transmission. When both passageways 216 and 218 are closed, clutch 38 is in free neutral. An embodiment of clutch 38 in which spool valve 217 and either passageway 216 or 218 are omitted would result in a nonreversible one-way clutch with a free neutral.

Mechanisms for controlling the eccentric throw, and thus the transmission ratio, are also a component of the present invention. These control mechanisms may be simple or complex, but several components are common to all embodiments. Referring again to FIGS. 1-3, control shaft 48 is a cylindrical shaft that is disposed around and journaled on input shaft 18 to rotate in housing 12 such that both shafts have the same axis of rotation. Control shaft 48 may rotate at the same rate and in the same direction as input shaft 18, but it is also turnable with respect to input shaft 18. Fork 50 is fixedly attached to control shaft 48. Engaged between the prongs of fork 50 is a pin 52 that is fixedly attached at one end to outer eccentric 30.

Means of rotating the control shaft 48 with respect to the input shaft 18 and of holding the control shaft 48 and input shaft 18 to rotate together as a unit complete the control mechanism. When the control shaft 48 is rotated with respect to the input shaft 18, the phase of the outer eccentric 30 changes with respect to the inner eccentric 28, thus changing eccentric throw and, ultimately, the output ratio of the transmission 10.

Figure 3:
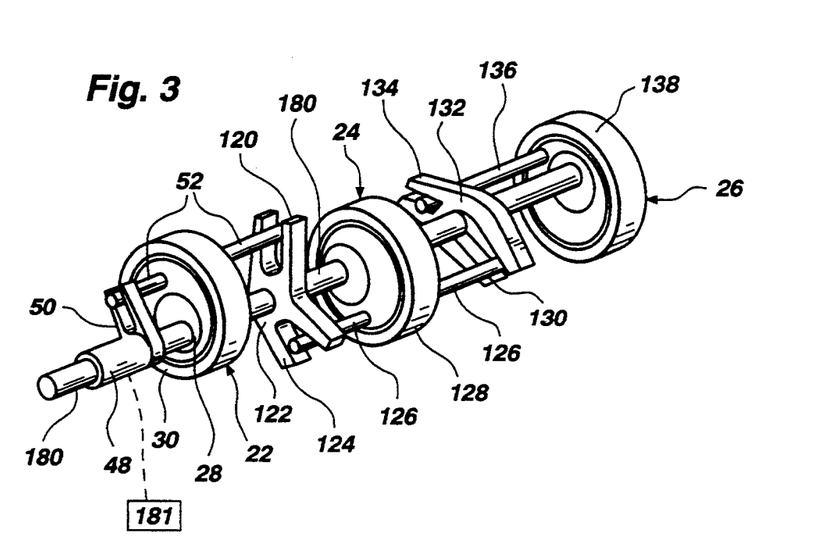
FIG. 3 is an exploded perspective view of eccentric control linkages of the transmission shown in FIGS. 1 and 2.

When the transmission of the type shown in FIGS. 1 and 2 contains more than one variable throw eccentric, the same principles are used but modifications are needed to coordinate and control all of the eccentrics. How this is done when the transmission contains three variable throw eccentrics is illustrated in FIG. 3 where inner eccentrics (such as 28) are keyed 120 degrees apart on input shaft 180. Instead of the end of pin 52 being fixed to outer eccentric 30, the middle of pin 52 is fixed to outer eccentric 30 and the ends of pin 52 extend perpendicularly from both sides of outer eccentric 30. One end of pin 52 extends to a location between and engages the prongs of a fork 50 and the other end extends to a location between and engages the first prongs 120 of fork 122. Fork 122 is journaled on and, thus, rotatably mounted on input shaft 180. Fork 122 includes first prongs 120 and second prongs 124 which extend from shaft 180 at a 120 degree angle from one another.

Engaged between second prongs 124 is one end of pin 126 which is fixedly attached near its middle to outer eccentric 128 of variable throw eccentric 24. The other end of pin 126 extends to a location between and engages the first prongs 130 of fork 132. Fork 132 is also rotatably mounted on input shaft 180 and contains first prongs 130 and second prongs 134, said first prongs 130 and second prongs 134 extending from shaft 180 at a 120 degree angle from one another. Engaged between second prongs 134 is one end of pin 136, the other end of which is fixedly attached to outer eccentric 138 of variable throw eccentric 26. Forks 50, 122, and 132 are positioned so that the three variable throw eccentrics 22, 24, and 26 are each angularly displaced 120 degrees out of phase with respect to the other two eccentrics. One skilled in the art would see that if the transmission 10 contained more than three variable throw eccentrics, the angular displacement of the eccentrics would have to be altered and more forks and pins would have to be added with the angles between the prongs extending from the input shaft having to be altered, also. In operation, when the control shaft 48 is rotated with respect to the input shaft 180, the system of forks and pins causes eccentric throw of all of the variable throw eccentrics to change coordinately.

Control of eccentric throw and, ultimately, of transmission ratio is achieved by selectively rotating the control shaft 48 with respect to the input shaft 18 or causing the control shaft 48 and input shaft 18 to rotate together as a unit. One simple means of effecting this control is shown in FIG. 2. Fixedly attached to and having the same rotational axis as control shaft 48 is face plate 54. Contained within face plate 54 is a circular array of identical openings 55. Fixedly attached to input shaft 18 and juxtaposed to face plate 54 is a torque arm 56 that contains an opening 58 matching the size and shape of and alignable with each opening in the face plate 54. A removable pin 60 may be engaged in opening 58 in torque arm 56 and one of the openings in face plate 54. When removable pin 60 is engaged, torque arm 56 and face plate 54 are held in constant relative position, thus providing constant eccentric throw and constant transmission ratio.

In operation, rotational input at input shaft 18 is transmitted through torque arm 56, removable pin 60, face plate 54, control shaft 48, fork 50, and pin 52 to outer eccentric 30. The transmission ratio may be changed by removing removable pin 60, manually changing the angular relationship of torque arm 56 and face plate 54, and reinserting removable pin 60. This operation changes the relative phases of the inner eccentric 28 and outer eccentric 30, thus changing eccentric throw and transmission ratio. Obviously, this simple gear changer does not provide for changing gear ratios under power. Shifting may be done only when the input shaft 18 and control shaft 48 are stationary. Further, the gear ratios available under such a system are limited by the arrangement of holes in the face plate 54.

Figure 8:
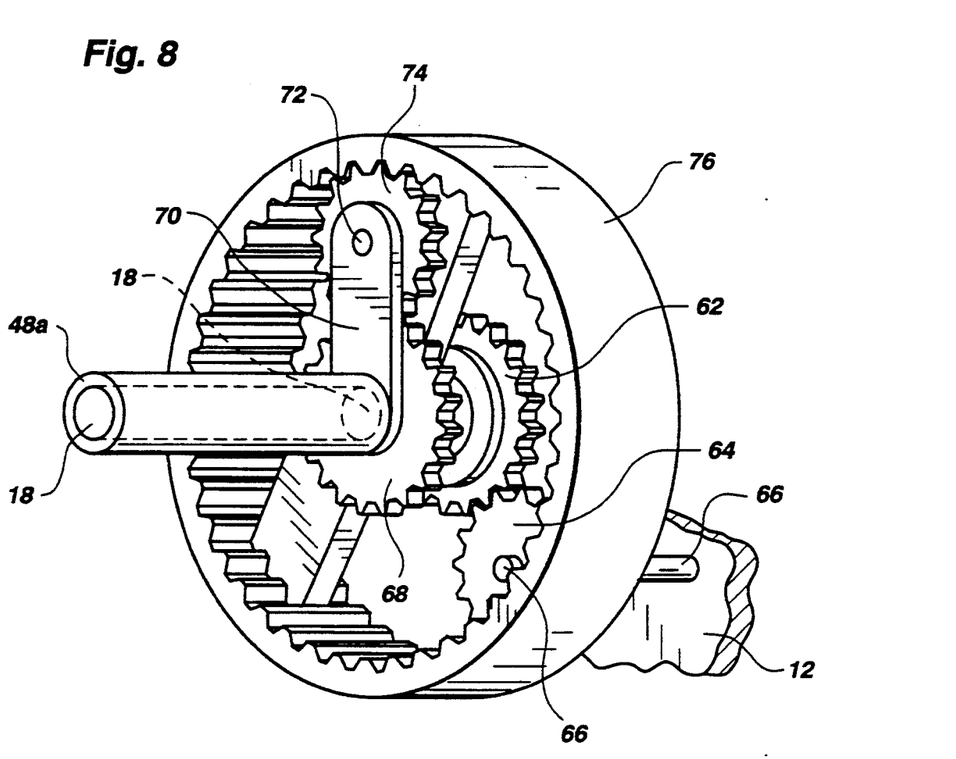
FIG. 8 is a perspective view of power shift control linkages suitable for use in the transmission shown in FIG. 1.

A means of controlling the transmission ratio that provides an infinite number of transmission ratios and power shifting is illustrated in FIG. 8. This embodiment of the invention involves a sun gear 62 fixedly attached to and having the same rotational axis as control shaft 48. A planet gear 64, in meshing relationship with sun gear 62, is rotatably attached to or journaled on shaft 66, which is fixed to and extends from the transmission housing 12. Sun gear 68, having the same size and number of teeth as sun gear 62, is fixedly attached to and has the same rotational axis as input shaft 18. A carrier 70 is rotatably attached to, or journaled on, one end of input shaft 18. Carrier shaft 72 is attached perpendicular to the plane of carrier 70. Planet gear 74, having the same size and number of teeth as planet gear 64, is rotatably attached to or journaled on carrier shaft 72 and is in meshing relationship with sun gear 68. A ring gear 76, disposed to be in meshing relationship with planet gear 64 and planet gear 74, is journaled on input shaft 18.

In operation, since sun gear 62 and sun gear 68 are identical and since planet gear 64 and planet gear 74 are identical, when carrier 70 is held still both sun gears 62 and 68 will rotate at the same speed and in the same direction, thus causing input shaft 18 and control shaft 48 to rotate as a unit and maintaining a selected gear ratio. When carrier 70 is moved, planet gear 74 moves in relation to planet gear 64, causing sun gear 62 to move in relation to sun gear 68, thus moving input shaft 18 with respect to shaft 48 and changing eccentric throw and transmission ratio.

Other means of rotating the control shaft with respect to the input shaft and, thus, controlling the gear ratios are contemplated and are within the scope of ordinary skill in the art. Such other means include hydraulic and electrical positioners 181 (FIG. 3).

Figure 9:
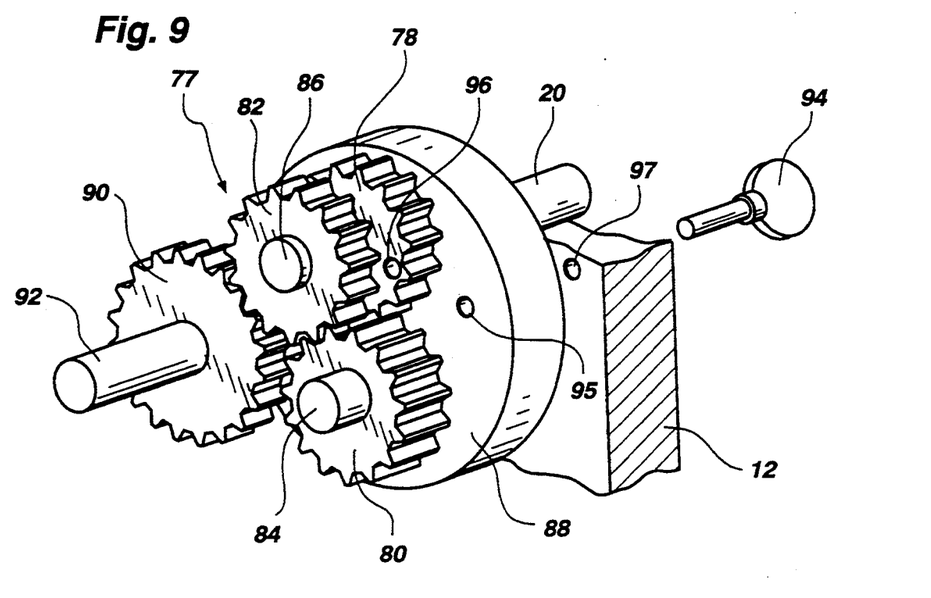
FIG. 9 is a perspective view of a spur gear differential, suitable for use in the present invention.

Alternative means of providing reverse rotation of the output are also contemplated as within the scope of the invention. One such means is through the reversible one-way clutch described above and depicted in FIG. 7. Another such means is addition of a spur gear differential 77, shown in FIG. 9, to a transmission 10, such as the one described in FIGS. 1-3. An arrangement that would provide the desired capability for reverse output rotation would be to fixedly attach a sun gear 78 to output shaft 20. In meshing relationship with gear 78 would be planet gear 80 journaled on shaft 84 extending perpendicularly from carrier 88, which is itself journaled on shaft 20. Planet gear 80 is also in mesh with planet gear 82, which is journaled on shaft 86 extending perpendicularly from carrier 88. Planet gear 82 is also in mesh with a sun gear 90 fixedly attached to a final output shaft 92. Preventing gear 78 from rotating with respect to carrier 88, such as by inserting a pin 94 through a hole 96 in gear 78 and hole 95 in carrier 88, causes the whole spur gear differential 77, including final output shaft 92, to turn as a unit in the same direction of rotation as shaft 20. Reverse rotation of shaft 92 is obtained by removing pin 94 from holes 95 and 96, and pinning carrier 88 to housing 12 by inserting pin 94 through hole 95 and hole 97. Output motion then flows through the series of four gears of the spur gear differential 77, causing rotation of final output shaft 92 to be opposite to that of output shaft 20. When pin 94 is not engaged, the transmission is in free neutral. Engagement of pin 94 may be operated through a gear shift lever. Brakes (not shown) may be used in lieu of a pin to prevent or allow rotation of carrier 88 and sun gear 78 and thus achieve the desired rotational direction of shaft 92.

Figure 10A:
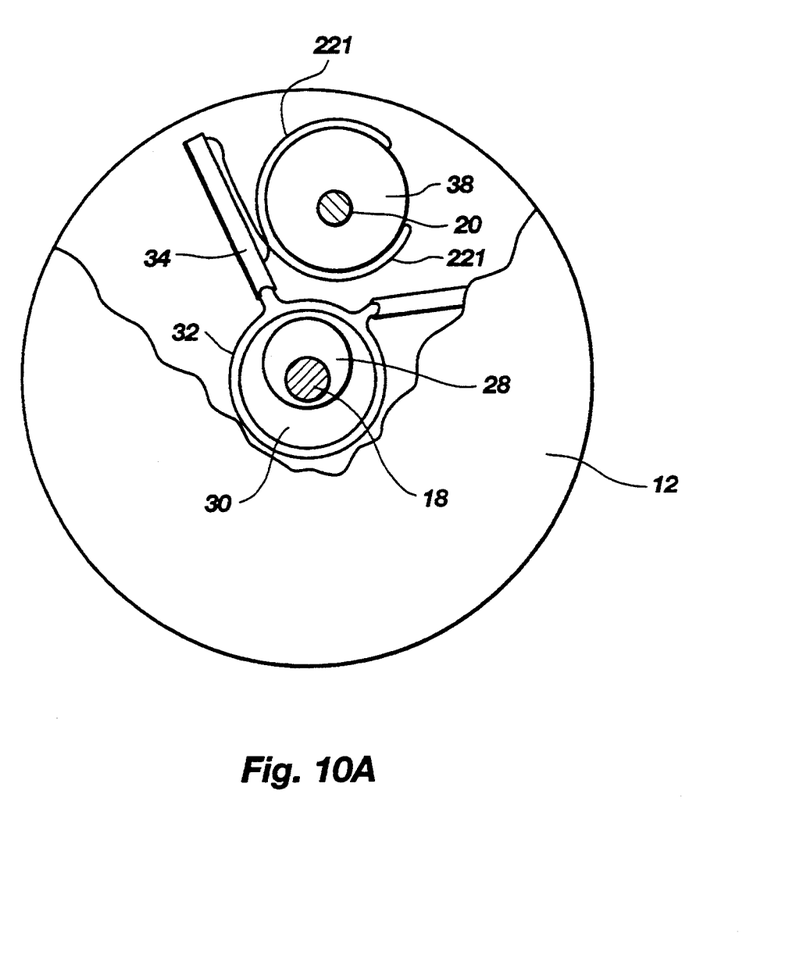
FIG. 10A is a partially cross-sectional, partially cutaway view of another embodiment of the transmission.

Another embodiment of the present invention, shown in FIG. 10, entails aligning an input shaft 198, control shaft 480, and output shaft 220 on the same axis of rotation 98. The connecting links 32, 34, and 36 and one-way clutches 38 are arranged radially around the axis of rotation 98. FIG. 10 shows three such sets of variable throw eccentrics, connecting links, and one-way clutches. Each one-way clutch 38 is attached to a planet shaft 140. Each planet shaft 140 bears a planet gear 142 that is in meshing relationship with a sun gear 144 fixed to output shaft 220. In this embodiment, rotation of the planet shafts 140 causes rotation of the planet gears 142, which drive sun gear 144 and output shaft 220 to which it is attached. A variation of this embodiment employs flexible links or tension members 221 (FIG. 10A), such as wires, ropes, or chains, instead of sun and planet gears to drive the output shaft.

Reverting the power train of this transmission may be obtained by preventing input and control shafts 198 and 480 from rotating and applying input rotation to the output shaft with output coming through the housing. No gearing or other linkage is required to power shift this reverted variation while it is in motion. Another reverted configuration may be obtained by preventing rotation of the output shaft, and applying input rotation to the input and control shafts, with output resulting through rotation of the housing.

FIGS. 11 and 12 show another embodiment of a transmission in accordance with the present invention, to include one inner eccentric 28 and one outer eccentric 30 upon which three links 32 are journaled. Links 32 are coupled to both anti-ripple links 40 and drive links 34. Link 34 drives cluster link 36 journaled on planet shaft 140 and meshing with gear teeth in one-way clutches 38 to provide a 1:1 output. Operated as a reverted train, eccentric shafts 18 and 48 are held still to maintain any selected transmission ratio. Shaft 18 is turned relative to shaft 48 to change transmission ratio or eccentric throw. Shaft 20, journaled on shaft 18, now serves as input and housing 12 as output. Housing 12 may be the hub of a wheel or pulley, or may be journaled inside a fixed housing but with a portion of the housing 12 projecting from the fixed housing to serve as an output shaft.

Compression braking is another variation of the instant invention that may be provided. One method of braking is to have the load drive the engine through a second, smaller, transmission 223 that is oriented oppositely to that of the first transmission 10 (FIG. 12). When the engine drives the load, the first transmission 10 is in operation and any speed or torque may be selected from the continuously variable gear rations available. Under these conditions, the second transmission 223 is overrunning because of the one-way clutches it contains. Then, when the load drives the engine, the first transmission 10 is in overrunning mode and the second transmission 223 becomes operational with any of its continuously variable gear ratios available to brake the load.

Figure 13:
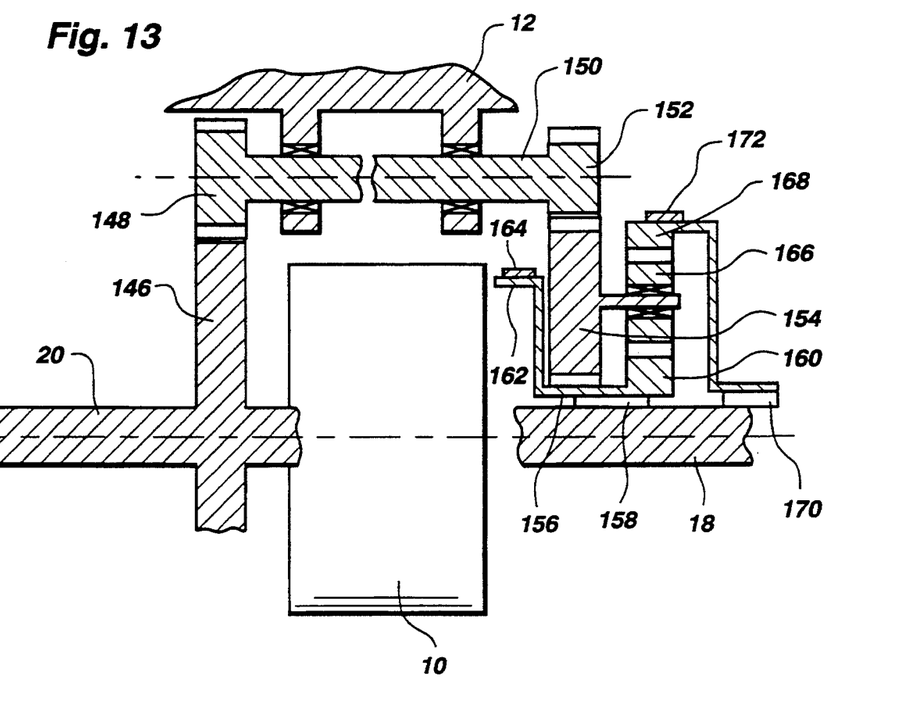
FIG. 13 is a partially cross-sectional, elevational side view of a an embodiment with compression braking, in accordance with the present invention.

Another means of providing compression braking is shown in FIG. 13. A gear 146 is fixedly attached to output shaft 20. In meshing relationship with gear 146 is gear 148 that is fixedly attached to one end of countershaft 150 journaled in housing 12. At the other end of countershaft 150 is fixedly attached another gear 152. In meshing relationship with gear 152 is gear 154, which also serves as a planetary gear carrier. Gear 154 is journaled on concentric shaft 156, said shaft 156 being disposed around and coupled to input shaft 18 by a one-way clutch 158. Fixed to shaft 156 are sun gear 160 and brake drum 162. Band brake 164 is disposed to be able to prevent rotation of brake drum 162 and, hence, shaft 156 and sun gear 160 that are attached to it. Planet gear 166 is journaled on carrier 154 and is in meshing relationship with sun gear 160. Also in mesh with planet gear 166 is a ring gear 168 that is coupled to input shaft 18 through a one-way clutch 170. A band brake 172 is disposed to be able to brake the rotation of ring gear 168.

In operation, by applying or releasing the brake bands 164 and 172 two different gear ratio may be selected for compression braking by the engine. If the load drives output shaft 20 faster than the engine and transmission 10 try to drive output shaft 20, then gears 146, 148, and 152 drive planetary carrier 154. If sun gear 160 is prevented from rotating by applying band brake 164, then ring gear 168 drives input shaft 18, through one-way clutch 170. Thus, the load drives the engine and compression braking occurs according to one particular gear ratio. If, on the other hand, band brake 164 is released and band brake 172 is applied to stop rotation of ring gear 168, then sun gear 160 turns, driving input shaft 18 through one-way clutch 158 at a second particular compression braking ratio. If both band brakes 164 and 172 are released, the compression brake is in free neutral. When output shaft 20 slows its rotation to match the transmission output speed, ring gear 168 and sun gear 160 turn too slowly to drive input shaft 18 through one-way clutches 158 and 170, and there is no compression braking.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

I claim:

1. A transmission comprising
   (a) a housing including an input opening, for permitting a rotatable input shaft from a prime mover to extend into the housing, and an output opening, for permitting a rotatable output shaft to extend out of the housing;
   (b) a rotatable input shaft extending through the input opening for providing input to the transmission;
   (c) at least one composite variable throw eccentric disposed on the input shaft, each composite eccentric having a pair of eccentrics, an inner one of which is fixed to the input shaft and an outer one of which is rotatably disposed on the inner eccentric and positionable with respect thereto to provide an eccentric throw between zero and a predetermined maximum;
   (d) control means for selectively maintaining or varying the throw of the composite eccentric or eccentrics;
   (e) a rotatable output shaft for providing a rotatable output;
   (f) a plurality of one-way clutches mounted on the output shaft for converting received reciprocating motion to rotational motion in the output shaft; and
   (g) connecting links for both coupling the composite eccentrics to the clutches for delivering reciprocating motion to the clutches from motion developed by the composite eccentrics and for reducing ripple from output rotation.

2. The transmission according to claim 1 wherein each pair of eccentrics of each composite variable throw eccentric is disposed on the input shaft to rotate about the same axis of rotation such that when the inner and outer eccentric are positioned in phase, maximum eccentric throw is produced by said each composite eccentric, and when the inner and outer eccentric are positioned 180 degrees out of phase, a minimum eccentric throw (which may be zero) is produced by said each composite eccentric.

3. The transmission according to claim 2 wherein the control means comprise
   a cylindrical control shaft disposed and rotatable about the input shaft so that both shafts have the same axis of rotation;
   a fork, having prongs extending therefrom, fixed to said control shaft;
   a pin extending from the outer eccentric and engaged between the prongs of the fork; and
   means for selectively rotating the control shaft with respect to the input shaft, thus rotating the outer eccentric with respect to the inner eccentric and changing eccentric throw and, ultimately, transmission ratio, and for maintaining a selected transmission ratio.

4. The transmission according to claim 3 further comprising
   a plurality of composite variable throw eccentrics disposed on the input shaft so that every 360/n degrees of angular rotation, where n is the number of composite variable throw eccentrics in the transmission, an eccentric extends from the shaft;
   one or more double forks rotatably disposed on the input shaft such that there is a double fork between each pair of composite eccentrics, said double forks having a pair of prongs that extend from the input shaft at a 360/n degree angle; and
   a plurality of pins, each pin having two ends thereof, such that one pin is fixed to the outer eccentric of each composite eccentric and the ends of the pins extend perpendicularly from the eccentric to a location between prongs of the adjacent forks, with the proviso that the composite eccentric distal to the control shaft has a pin that extends to only one side of the eccentric;
   wherein rotation of the control shaft with respect to the input shaft causes eccentric throw of all the composite eccentrics in the transmission to change coordinately and holding the control shaft to rotate as a unit with the input shaft maintains a selected eccentric throw.

5. The transmission according to claim 3 wherein the means of rotating the control shaft with respect to the input shaft and of maintaining a selected transmission ratio comprise
   a face plate fixed to and having the same rotational axis as said control shaft, said face plate containing a circular array of identical openings;
   a torque arm disposed on the input shaft and juxtaposed to said face plate, said torque arm containing an opening matching the size and shape of and alignable with the openings in the face plate; and
   a removable pin that may be slidably engaged with the openings in the torque arm and face plate, said removable pin, when engaged, holding the torque arm and face plate in constant relative position;
   wherein the transmission ratio may be changed by removing the removable pin, rotating either the torque arm or face plate, and thus the control shaft and input shaft, with respect to the other thereby changing the throw of the composite eccentric, and reinserting the removable pin.

6. The transmission according to claim 3 wherein the means of rotating the control shaft with respect to the input shaft and of maintaining a selected transmission ratio comprise a first sun gear fixed to and having the same rotational axis as the control shaft;

a first planet gear in meshing relationship with said first sun gear and held in constant relative position by being rotatably disposed on a shaft that is fixed to and extends from the transmission housing;

a second sun gear of the same size and number of teeth as the first sun gear, said second sun gear fixed to and having the same rotational axis as the input shaft;

a carrier rotatably disposed on the input shaft and having a carrier shaft extending perpendicularly therefrom;

means of rotating said carrier about its point of rotational attachment to the input shaft;

a second planet gear of the same size and number of teeth as the first planet gear, said second planet gear rotatable disposed on said carrier shaft and in meshing relationship with said second sun gear; and a ring gear rotatably disposed on the input shaft and in meshing relationship to said first and second planet gears;

wherein holding the carrier stationary maintains the throw of the composite eccentric, thus maintaining a selected transmission ratio, and rotating the carrier rotates the control shaft with respect to the input shaft to change the throw of the composite eccentric, and thereby change the transmission ratio.

7. The transmission according to claim 3 wherein the means of rotating the control shaft with respect to the input shaft and of maintaining a selected transmission ratio is selected from the group consisting of hydraulic and electrical positioners.

8. The transmission according to claim 2 wherein the connecting links comprise a first link having an annulus and first and second radially projecting tabs such that the annulus is rotatably disposed about the outer eccentric;

a second link that is pivotally disposed on said first tab;

a bell crank that is disposed on the one-way clutch and pivotally disposed on the second link; and an anti-ripple link having first and second ends such that the first end is pivotally disposed on the second tab of the first link and the second end is disposed on the housing;

wherein the anti-ripple link guides oscillation of the first link, second link, and bell crank and changes the effective length of the second link to thus [remove]reduce ripple to a minimum level at one selected transmission ratio and reduce ripple to a lesser extent at other transmission ratios.

9. The transmission according to claim 2 wherein the connecting links comprise a first link having an annulus and first and second radially projecting tabs such that the annulus is rotatably disposed about the outer eccentric;

a second link that is pivotally disposed on said first tab;

a bell crank that is disposed on the one-way clutch and pivotally disposed on the second link;

a slot in the housing; and a pin extending perpendicularly from the second tab of the first link so that an end of the pin is disposed in the housing slot;

wherein reciprocal motion of the first and second links and bell crank are constrained and guided by the contour of the housing slot to reduce ripple from output rotation.

10. The transmission according to claim 2 wherein the connecting links comprise a first link having an annulus and first and second radially projecting tabs such that the annulus is rotatably disposed about the outer eccentric;

a second link that is pivotally disposed on said first tab;

a bell crank that is disposed on the one-way clutch and pivotally disposed on the second link;

an anti-ripple link pivotally disposed on the second tab of the first link and having an elongate opening such that along one side of said opening the anti-ripple link contains a first rack gear;

a second rack gear disposed on the housing;

a slot in the housing;

a slide pivotally disposed on the anti-ripple link and slidably disposed in the slot and having a fulcrum pin extending from said slide;

a cluster gear disposed on the fulcrum pin and said gear in meshing relationship with the first and second rack gears;

a yoke extending from the control shaft with the fulcrum pin engaged therewith;

wherein rotation of the control shaft causes the yoke to move the slide in the slot, the second rack causes the cluster gear to rotate, and rotation of the cluster gear moves the first rack, thus increasing or diminishing the effective length of the anti-ripple link and location of the fulcrum pin for each selected transmission ratio.

11. The transmission according to claim 2 wherein the connecting links comprise a first link having an annulus and first and second radially projecting tabs such that the annulus is rotatably disposed about the outer eccentric;

a second link that is pivotally disposed on said first tab;

a bell crank that is disposed on the one-way clutch and pivotally disposed on the second link;

two slots in the housing;

an anti-ripple link pivotally disposed on the second tab of the first link and having an elongate opening, two pins extending perpendicularly from the anti-ripple link so that an end of each pin is disposed in a housing slot, and a tab;

a pin extending perpendicularly from the second tab of the first link so that an end of the pin is disposed in the elongate slot of the anti-ripple link; and a yoke extending from the control shaft having a pin engaged therewith, said pin extending to and disposed on the tab of the anti-ripple link;

wherein rotation of the control shaft causes the yoke to move the anti-ripple link according to the contours of the housing slots, thus increasing or diminishing the effective length of the anti-ripple link and guiding the reciprocal motion of the first link, second link, and bell crank.

12. The transmission according to claim 2 wherein the one-way clutch is selected from the group consisting of roller clutches, sprag clutches, and hydraulic clutches.

13. The transmission according to claim 12 wherein the one-way clutch is a hydraulic clutch.

14. The transmission according to claim 2 further comprising means for reversing the rotation of the output shaft, wherein the reverse means is selected from the group consisting of a spur gear differential and a reversible one-way clutch.

15. The transmission according to claim 14 wherein the reverse means is a spur gear differential comprising
   a slidable pin;
   a first sun gear fixed to and having the same axis of rotation as the transmission output shaft, said first sun gear including an opening into which a slidable pin may be engaged;
   a carrier rotatably disposed on the output shaft, said carrier including an opening into which the slidable pin may be engaged;
   first and second planet shafts extending perpendicularly from the carrier;
   first and second planet gears rotatably disposed on said first and second planet shafts, respectively, so that the first planet gear is in mesh with both the first sun gear and with the second planet gear;
   a final output shaft including a second sun gear fixed to and with the same axis of rotation as the final output shaft, said second sun gear in mesh with the second planet gear; and
   an opening in the housing into which the slidable pin may be engaged;
   wherein aligning the openings in the first sun gear and the carrier and inserting the slidable pin through said openings to prevent the first sun gear from rotating with respect to the carrier causes the spur gear differential to rotate as a unit so that the final output shaft rotates in the same direction as the transmission output shaft, and wherein removing the slidable pin from the openings in the first sun gear and carrier and pinning the carrier to the housing by aligning the openings in the carrier and housing and inserting the slidable pin through said openings so that the carrier is prevented from rotating with respect to the housing causes the rotational motion of the output shaft to be transferred, in turn, through the first sun gear, the first planet gear, the second planet gear, and the second sun gear to the final output shaft so that the final output shaft rotates in the opposite direction as the transmission output shaft, and wherein removing the slidable pin from all of the openings in the first sun gear, carrier and housing causes the transmission to be in free neutral.

16. The transmission according to claim 2 further comprising
   a sun gear fixed to and having the same rotational axis as the output shaft; and
   a plurality of planet shafts each having disposed thereon a one-way clutch and a planet gear such that the planet gear is in meshing relationship with said sun gear;
   wherein the transmission contains only one composite eccentric and the input shaft, control shaft, and output shaft have the same rotational axis, and wherein reciprocating motion of the connecting links and one-way clutches causes rotation of said planet shafts and their planet gears, thus rotating the sun gear and output shaft.

17. The transmission according to claim 2 further comprising
   a plurality of planet shafts;
   a cluster link, including a segment gear rotatably disposed on each planet shaft with each cluster link being coupled to and oscillated by connecting links; and
   a gear segment fixedly disposed on each one-way clutch with each said gear segment in mesh with a cluster link segment gear;
   wherein the input, control, and output shafts have the same axis of rotation and oscillation of the cluster links oscillates the one-way clutches, and, thus rotates the output shaft.

18. The transmission according to claim 2 further comprising
   a plurality of planet shafts each bearing a cluster link;
   a plurality of flexible links, each said flexible link disposed on a cluster link and a one-way clutch;
   wherein the input shaft, control shaft, and output shaft have the same rotational axis; reciprocating motion of the cluster links causes the flexible links to oscillate said one-way clutches, thus rotating the output shaft; and the flexible links are selected from the group consisting of wires, ropes, and chains.

19. The transmission according to claim 2 further comprising means for compression braking.

20. The transmission according to claim 19 wherein the means for compression braking comprises a second transmission coupled to the input shaft and the output shaft for selectively driving the prime mover.

* * * * *